United States Patent [19]

Peterson

[11] 3,989,995

[45] Nov. 2, 1976

[54] FREQUENCY STABILIZED SINGLE-ENDED REGULATED CONVERTER CIRCUIT

[75] Inventor: William Anders Peterson, Lake Parsippany, N.J.

[73] Assignee: Bell Telephone Laboratories, Incorporated, Murray Hill, N.J.

[22] Filed: May 5, 1975

[21] Appl. No.: 574,560

[52] U.S. Cl. ............................. 321/2; 323/DIG. 1; 323/17; 331/109; 331/112; 321/18
[51] Int. Cl.² ........................................... H02M 7/20
[58] Field of Search ................. 321/2, 18; 331/109, 331/112; 323/17, DIG. 1

[56] References Cited
UNITED STATES PATENTS

| | | | |
|---|---|---|---|
| 3,515,974 | 6/1970 | Stich | 321/2 |
| 3,638,096 | 1/1972 | Judd et al. | 321/2 X |
| 3,675,159 | 7/1972 | Judd et al. | 331/109 |
| 3,678,412 | 7/1972 | Spies | 331/112 |
| 3,889,173 | 6/1975 | Klusmann et al. | 321/2 |

*Primary Examiner*—Gerald Goldberg
*Attorney, Agent, or Firm*—Alfred G. Steinmetz

[57] ABSTRACT

In a typical self-oscillating, single-ended converter that is pulse width modulated to regulate the output signal, duty cycle changes to stabilize the output signal cause the switching frequency of the converter to vary.

The switching frequency of the single-ended converter disclosed herein is stabilized by controlling the on and off durations of the switching device in an inverse proportional relationship to each other. The relation is controlled by adjusting the charging threshold of a timer circuit controlling the conducting interval of the switching devices in response to a voltage regulation error signal which controls the nonconducting interval thus limiting the total period of the switching device to a fixed interval.

10 Claims, 3 Drawing Figures

FREQUENCY STABILIZED SINGLE-ENDED REGULATED CONVERTER CIRCUIT

BACKGROUND OF THE INVENTION

This invention relates to self-oscillating regulated converters and, more particularly, to a single-ended feedthrough type of converter. It is specifically concerned with frequency stabilization of the switching of such a converter.

Self-oscillating regulators or converters may be regulated by pulse width modulation of the switching device. In such arrangements a voltage regulation circuit monitors a voltage to regulated and modifies the duty cycle of the converter switching device to maintain the desired regulated output voltage. In a self-oscillating type converter the frequency tends to vary as the duty cycle is altered to maintain the regulated output voltage. In the past these frequency variations have either been tolerated or the frequency has been stabilized by means of an auxiliary outside frequency source to which the switching of the converter is synchronized. This synchronizing arrangement is undesirable because a separate source of oscillating frequency is needed, adding to the cost and complexity of the circuit.

Another frequency stabilization arrangement detects the ripple frequency of the output signal of the regulated converter and converts this to a frequency responsive control voltage. This frequency responsive control voltage is compared to a reference voltage and is used to modify the gain of the regulation feedback system to maintain the switching frequency at some desired value. This system, while advantageously eliminating the need for a separate frequency source, disadvantageously requires a separate frequency control feedback arrangement and sufficient ripple signal at the output of the regulated circuit to enable it to operate. Also the typical feedback arrangement to couple this ripple frequency to the frequency-to-voltage conversion circuit prevents the use of simple isolation techniques between the input and output of the converter circuit.

It is desirable to operate self-oscillating regulated converter circuits at a stabilized frequency. It is also desirable to achieve this frequency stabilization without the necessity of complicated feedback arrangements which eliminate isolation between the input and output of the circuit.

SUMMARY OF THE INVENTION

Therefore, in accordance with the present invention, the switching frequency of a self-oscillating single-ended converter circuit is stabilized by controlling the consecutive on and off durations of the switching device in an inverse proportional relationship to each other. This relationship is controlled by adjusting the initial charging threshold voltage of a timing circuit controlling the conducting interval of the switching device in response to a voltage regulation error signal which controls the nonconducting interval thus limiting the total period of the switching device to a fixed interval.

DETAILED DESCRIPTION

Figure 1:
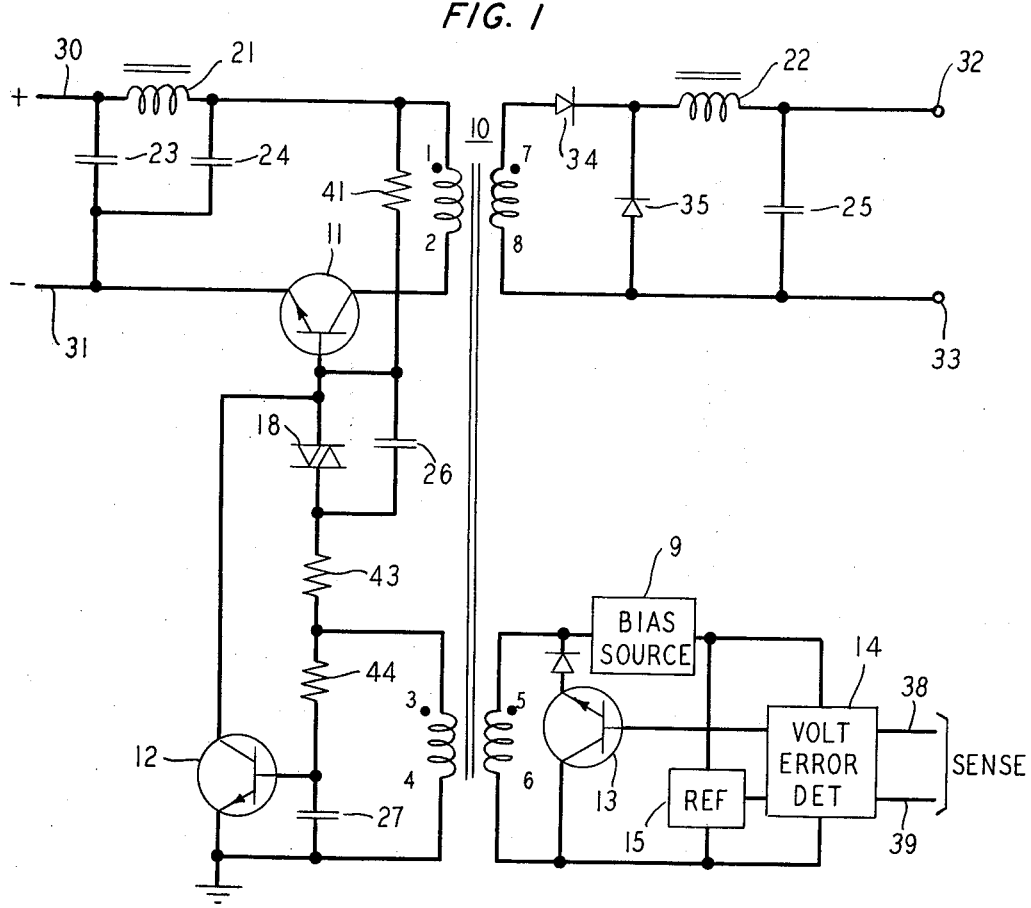
FIG. 1 is a schematic of a self-oscillating single-ended converter including frequency stabilization circuitry embodying the principles of the invention.

A frequency stabilized single-ended converter including voltage regulation control circuitry to regulate the output voltage is disclosed in FIG. 1. A DC voltage source, not shown, is coupled to the input terminals 30 and 31. These terminals 30 and 31 are periodically electrically connected in series circuit with the primary winding 1–2 of the power transformer 10 in response to the periodic switching of the switching transistor 11. The secondary winding 7–8 is coupled by the rectifying diode 34 and the output filter, comprising the inductor 22 and capacitor 25, and from thence to the output terminals 32 and 33 to which a load may be connected. A commutating or flyback diode 35 is included to conduct the output current during intervals when the rectifying diode 34 is back biased.

Two voltage sensing leads 38 and 39 may be coupled across the output terminals 32 and 33 or directly across a load coupled thereto. The voltage monitored at the load or the output terminals 32 and 33 is coupled, via the voltage sensing leads 38 and 39, to a voltage error detector 14. The voltage error detector 14 compares this voltage with a reference voltage supplied by the reference voltage source 15. The reference voltage source is energized by the bias voltage source 9 which derives a DC bias signal from the voltage across winding 5–6. An error signal representing the deviation of the output voltage from its regulated value is generated and applied to the base of transistor 13 to control its conductivity. The conductivity of transistor 13 controls the magnitude of the voltage generated across transformer winding 5–6 during the nonconducting interval of the switching transistor 11, as is described hereinbelow.

The frequency stabilization properties of the converter circuit of FIG. 1 may best be understood by describing its operation. Upon the application of the DC voltage to the input terminals 30 and 31, a DC signal is applied, via the input filter comprising the inductor 21 and the capacitors 23 and 24, to resistor 41. At the instance of initial application of the voltage, the transistor 11 is nonconducting. However, current flows through the resistor 41 to the base of switching transistor 11. A varistor 18 connected to the base is utilized to prevent this drive current from being shunted from the base of transistor 11.

Transistor 11 is biased conducting in response to this drive current produced by the applied DC voltage. With transistor 11 conducting, a DC voltage is applied across the primary winding 1–2. In response to this DC voltage applied across winding 1–2, voltages in accordance with the dot notations on FIG. 1 are induced in the secondary winding 7–8 and in the feedback windings 5–6 and 3–4. The voltage induced across winding 7–8 forward biases the rectifying diode 34 and current is applied, via the output filter inductor 22, to the output terminal 32 and from thence to a load connected thereto. A filter capacitor 25 shunting the output terminals 32 and 33 is utilized to reduce the ripple voltage output to a minimum.

In response to the voltage applied to the primary winding 1–2, a regenerative feedback voltage is induced in the feedback winding 3–4. This induced feedback voltage is applied, via resistor 43, and the parallel-connected varistor 18 and capacitor 26, to the base of transistor 11 to regeneratively drive it further into its conduction state and finally into saturation. This regenerative feedback voltage also charges a capacitor 27 to a positive voltage, via the resistor 44. The charging of capacitor 27, while exponential, is within the normal charging range essentially linear. The voltage on the capacitor 27 increases in magnitude in response to the regenerative charging. This positive voltage is applied to the base of transistor 12 and upon attaining a predetermined voltage threshold biases it into conduction. With the transistor 12 biased into conduction, the base current applied to transistor 11 is diverted from the base of transistor 11 through the collector-emitter path of transistor 12 to ground. The switching transistor 11 is biased nonconducting and the DC voltage is removed from the primary winding 1–2. In response to this removal of voltage, a reverse voltage is induced in the transformer windings 7–8, 3–4, and 5–6.

The reverse voltage induced across the secondary winding 7–8 reverse biases the rectifying diode 34. The load current is conducted through the flyback diode 35 in response to the induced voltage in the inductor 22 and is applied, via terminal 32, to the load. The reverse voltage generated in the winding 3–4 charges the capacitor 27 in a negative polarity direction as compared to the positive polarity charging induced in response to the current conducted by transistor 11. The positive voltage originally stored on capacitor 27 during the conduction of transistor 11 is discharged through resistor 44 and through the collector-base path of transistor 12. Capacitor 27 is charged to a negative polarity voltage. The magnitude of this voltage is controlled by the voltage regulation feedback circuitry as described below.

Figure 2:
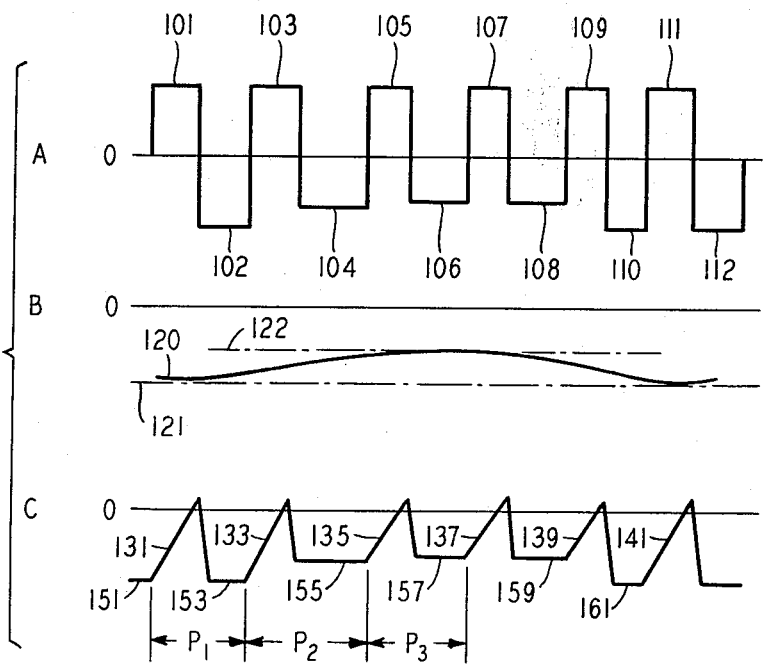
FIG. 2 discloses voltage waveforms to assist in a description of the circuit disclosed in FIG. 1.

The frequency stabilization characteristics become readily apparent with explanation of the voltage feedback circuitry and upon examination of the voltage waveform diagrams A, B, and C shown in FIG. 2. Waveform diagram A represents the positive and negative voltages appearing across winding 3–4. Pulses 101, 103, 105, 107, 109, and 111 represent the positive voltage pulses induced across winding 3–4 when the transistor 11 is conducting. The pulses 102, 104, 106, 108, 110, and 112 represent the negative voltage pulses induced across the winding 3–4 when the transistor 11 is nonconducting. The respective volt time areas of the adjacent positive and negative pulses are substantially identical. The transformer core reset volt-second area is substantially equal to the volt-second area established during the conduction of transistor 11. It is apparent from examination of the voltage waveforms shown for the negative pulses 102, 104, 106, 108, 110, and 112 that the voltage magnitudes of these pulses are not all identical. For example, the magnitudes of pulses 102, 110, and 112 are larger than the magnitudes of pulses 104, 106, and 108. These magnitudes are changed in response to the voltage regulation feedback circuitry of the converter. The magnitudes of the positive voltage pulses 101, 103, 105, 107, 109, and 111 are responsive to the magnitude of the DC voltage applied to input terminals 30 and 31.

The error voltage responsive to deviations of the output voltage of the converter across terminals 32 and 33 is represented by voltage waveform 120 of waveform diagram B. The error voltage waveform 120 varies in magnitude from a high level 121 to a low level 122. The output voltage of the converter is coupled via sensing leads 38 and 39 to the voltage error detector 14. The reference voltage source 15 is energized by DC bias source 9 in response to the voltage across the winding 5–6. The reference source 15 in the illustrative embodiment may comprise a voltage breakdown device. This reference voltage is compared with the sensed output voltage and the error voltage derived therefrom and shown by waveform 120 controls the conductivity of transistor 13 to control the voltage across winding 5–6 during the nonconducting interval of switching transistor 11.

As indicated above, the positive voltage waveforms 101 through 111 have equal magnitudes. These magnitudes are established in response to the DC input voltage applied to terminals 30 and 31. This voltage controls the charging rate at which the capacitor 27 is charged. The negative voltage magnitude to which the capacitor 27 is charged is variable and responsive to the voltage regulation feedback. The impedance of the collector-emitter path of transistor 13 is directly responsive to the output of the voltage error detector 14, and controls the negative voltage magnitude applied across feedback winding 5–6. This voltage in turn controls the negative voltage magnitude to which the capacitor 27 is charged.

The negative voltage magnitude to which the capacitor 27 is charged is inversely proportional to the flyback time or the time necessary to reset the core of the transformer 10 after transistor 11 is biased nonconducting. This controls the initial voltage at which the capacitor 27 begins to charge in the positive direction due to regenerative feedback. This is readily apparent upon inspection of waveform diagram C where the charging waveform of capacitor 27 is shown by the successive positive charging ramp waveforms 131, 133, 135, 137, 139, and 141. All of the charging ramp waveforms have identical charging rate slopes in the example herein assuming the input voltage is relatively constant. The initial starting voltage threshold for each charging ramp waveform is shown by the voltage magnitudes 151, 153, 155, 157, 159, and 161, respectively. It is apparent that as the error voltage 120 becomes more positive, the initial charging threshold voltage becomes more positive from an initial threshold voltage level 151 to a subsequent threshold voltage level 155. As the error voltage moves in the negative direction, the initial charging threshold returns to a voltage threshold level 161.

It is apparent from inspection of the waveforms disclosed that the on and off times of the transistor 11 in each period vary inversely with each other and thereby the frequency at which the converter switches is stabilized. For example, the first period, designated $P_1$ in FIG. 2, is modified to a slightly increased time duration period, $P_2$, as the error voltage moves in a positive direction. However, once the voltage regulation circuitry responds to the new voltage, the next successive period, $P_3$, is identical in time duration magnitude to the initial period $P_1$. Hence, the converter frequency is stabilized at the same value even though the pulse width has decreased. It is readily apparent from the foregoing description that as the charging level of the capacitor 27 is modified in response to the voltage regulation feedback, a temporary phase shift occurs in the output pulse waveforms, but within approximately one cycle the frequency is stabilized to its desired value.

While the above circuit is described assuming a linear charging rate for capacitor 27, it is readily apparent to those skilled in the art that absolute frequency stabilization may be achieved by utilizing constant current regulating means to charge capacitor 27.

Figure 3:
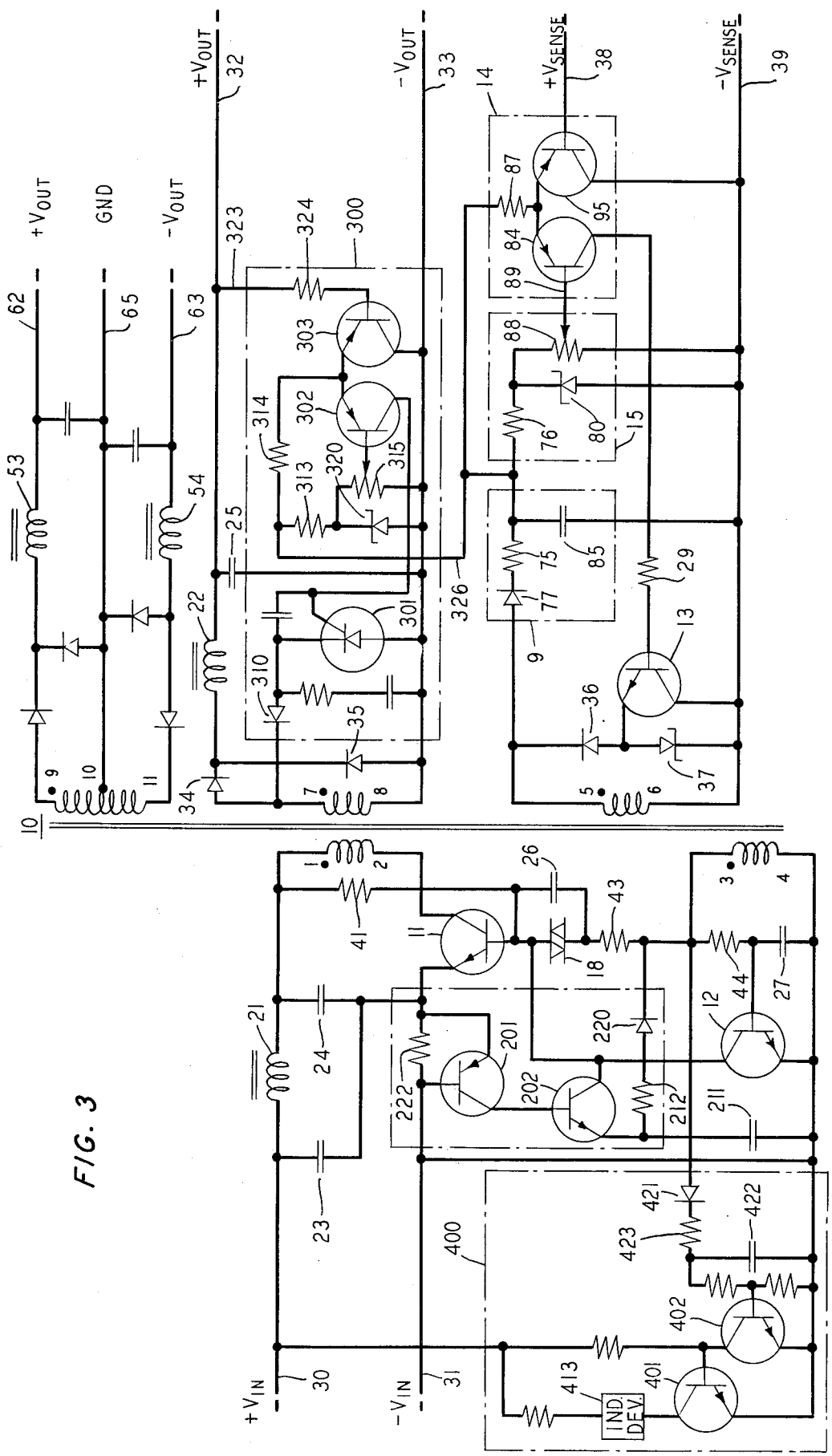
FIG. 3 is a detailed schematic of a single-ended self-oscillating regulated converter circuit embodying the principles of the invention.

A detailed embodiment of the converter circuit of FIG. 1 is disclosed in FIG. 3. Identical components have the same identifying reference numerals in both FIG. 1 and 3. A DC voltage source is coupled to the input terminals 30 and 31. The resulting current through the resistor 41 biases the transistor 11 into conduction. With transistor 11 conducting, a current is transmitted through primary winding 1–2 of the transformer 10. The current flowing through the winding 1–2 induces a voltage in the feedback windings 3–4 and 5–6, and the secondary windings 7–8 and 9–11. A regenerative feedback voltage, being positive at winding end 3, is induced in feedback winding 3–4.

The regenerative feedback voltage induced across winding 3–4 generates a drive current which is applied via the resistor 43, varistor 18, and the capacitor 26 to the base of transistor 11 to drive it into its saturated condition. This regenerative current is also utilized to charge the capacitor 27 positively through the resistor 44. The charging of capacitor 27 continues until the positive voltage on capacitor 27 exceeds the base-emitter turn-on voltage of transistor 12. This biases the transistor 12 into its conducting state and shunts drive current away from the base of transistor 11.

The transistor 11 turns off and a reverse voltage is induced in the windings of transformer 10 due to the interruption of current in the primary winding 1–2. A reverse polarity voltage being negative at winding end 3 now appears across the winding 3–4. This reverse polarity voltage induces a reverse current which biases the transistor 11 through the resistor 43, varistor 18, and capacitor 26 into its nonconducting state. The length of time that this voltage across winding 3–4 remains negative at winding end 3 is determined by the reset voltage of the transformer core.

The voltage developed across the output winding 7–8 is regulated in response to an error amplifier 14 which has voltage sensing leads 38 and 39 connected to the voltage to be regulated. In the embodiment described herein the sensing leads 38 and 39 may be considered to be coupled to the output leads 32 and 33. A bias voltage to energize the error amplifier 14 is derived from the winding 5–6 by the bias voltage source 9. The voltage across winding 5–6 charges the capacitor 85 through diode 77 and resistor 75. The DC bias voltage is stored on the capacitor 85. A reference voltage is derived by the reference voltage source 15 from the bias voltage by using the voltage stored on capacitor 85 to energize the voltage breakdown diode 80. This reference voltage is applied across resistor 88 and applied, via lead 89, to the base of transistor 84 of the error amplifier 14. The sensing lead 38 is connected to the base of transistor 95. An error signal responsive to the voltage difference between the two inputs to error amplifier 14 is applied via resistor 29 to the base of transistor 13. The feedback winding 5–6 is shunted by a series circuit connection of a diode 36 and a voltage breakdown diode 37. The voltage breakdown diode 37 is shunted by the collector-emitter path of the transistor 13 whose conductivity is in turn responsive to the output of the error amplifier 14. The voltage breakdown diode 37 is included to provide a flyback current path if transistor 13 is biased nonconducting.

As described above, during the nonconducting period of the transistor 11 the capacitor 27 is charged to a negative voltage. This negative voltage is directly proportional to the reverse voltage developed across winding 5–6. The magnitude of this reverse voltage across winding 5–6 is controlled by the impedance of transistor 13 which is responsive to the output of the error amplifier 14. The magnitude of the reverse voltage developed across winding 5–6 controls the initial voltage from which the capacitor 27 starts charging positively, when the transistor 11 is initially turned on by the drive current applied to its base via resistor 41. The final positive voltage charge achieved on the capacitor 27 which is sufficient to turn off the transistor 11 has a fixed magnitude.

As is apparent from the foregoing description of the operation of the converter circuit, the switching transistor 11 is initially biased conducting each cycle by a base current through resistor 41 due to the DC voltage applied to the input terminals 30 and 31. The transistor 11 conducts current and a regenerative current in winding 3–4 charges the capacitor 27 positively from a first voltage threshold established by the voltage feedback control described above. The capacitor 27 charges positively to a second voltage threshold at which the transistor 11 is biased nonconducting. The time during which the transistor 11 conducts establishes a certain flux level in the core of transformer 10 which is proportional to the product of the conduction time and the applied voltage.

The capacitor 27 is discharged rapidly to the first voltage threshold as soon as the transistor 11 is biased nonconducting. However, the flux in the core must be reset by a signal whose product of conduction time and voltage equals the product of conduction time and voltage established during the conduction of transistor 11. As the first voltage threshold varies and the second voltage threshold is a fixed value, the respective times of the set and reset conduction times vary inversely. Hence the conducting and nonconducting intervals of the transistor 11 vary inversely. The switching control thereby maintains a substantially constant period each cycle, stabilizing the frequency at which the converter switches.

The rate at which the capacitor 27 is charged to a positive turn-off voltage is proportional to the DC input voltage applied to input terminals 30 and 31. If the DC input voltage increases, the rate at which capacitor 27 is positively charged increases thereby reducing the on time of transistor 11 to compensate for the increased input voltage. The rate of charging is reduced if the DC input voltage decreases. This, however, does not alter the switching frequency of the converter inasmuch as this changed charging rate is compensated for by a changed error voltage. The converter is inherently line compensated whereby the output is regulated independently of line voltage changes.

The converter circuit disclosed in FIG. 3 is shown as having three outputs. The voltage output on output terminals 32 and 33 is derived from secondary winding 7–8. This voltage is a regulated output voltage responsive to the regulation circuit described hereinabove. Two opposite polarity outputs are derived from secondary winding 9–11. The two opposite polarity voltages are each referenced to lead 65 connected to the center tap 10 of winding 9–11. A positive voltage is supplied at output lead 62 with reference to the reference lead 65, and a negative voltage is derived at output lead 63 negative with respect to the reference lead 65. This voltage is essentially regulated inasmuch as the output of the winding 7–8 is regulated.

The converter circuit disclosed in FIG. 3 includes protection circuitry to provide protection against overvoltages and overcurrents. A low voltage alarm circuit monitors low voltage conditions. A current limiting circuit 200 is included on the primary side of the converter to protect the converter from overcurrent conditions. The current flowing through the transistor 11 is sensed by monitoring the voltage across a resistor 222 connected in series thereto. A transistor 201 has its base-emitter junction shunted across resistor 222. When the voltage across resistor 222 exceeds a certain threshold, the transistor 201 is biased into conduction. The conducting transistor 201 biases transistor 202 into conduction. The conduction of transistor 202 completes a current path to shunt base current from the base of the switching transistor 11 into the capacitor 211. The transistor is hence biased nonconducting when an overcurrent occurs.

The capacitor 211 is normally charged to the peak negative voltage which is established across the capacitor 27. The conduction of the transistor 202 discharges the capacitor 211 by shunting the base current of transistor 11 thereto. During the off time of transistor 11, the capacitor 211 is recharged through the resistor 212 and diode 220 in response to the reverse negative voltage generated across the winding 3–4. The lowered voltage of capacitor 211 due to the previous discharge limits the reverse negative voltage and hence increases the off time of transistor 11.

A high voltage limiting circuit 300 is utilized to limit the output voltage of the converter should an overvoltage occur at the output. The high voltage limiting circuit 300 includes a reference voltage generator comprising a resistor 313, the voltage breakdown diode 320, and a resistor 315. The reference voltage generated across the voltage breakdown diode 320 is derived from the voltage on capacitor 85. This voltage is applied to the breakdown diode 320 via lead 326 and resistor 313. The reference voltage is applied to the base of transistor 302 via resistor 315. Transistor 302 is connected with transistor 303 in a differential amplifier configuration. The output voltage at terminal 32 is applied via lead 323 and resistor 324 to the base of transistor 303. If the voltage applied to the base of transistor 303 exceeds the reference voltage applied to the base of transistor 302, transistor 302 is biased conducting. The collector of transistor 302 is coupled to the trigger of the SCR 301. The conduction of transistor 302 triggers SCR 301 into conduction. With the SCR 301 conducting, the voltage developed across the winding 7–8 during the nonconduction of transistor 11 is clamped to the forward voltage of the SCR 301 plus the forward voltage of a diode 310 connected in series thereto. This controlled reverse voltage constrains the switching transistor 11 of the converter to operate at its maximum off time and minimum on time conditions and hence limits the output voltage to a minimum value.

The output voltage of the converter is monitored by a low voltage alarm circuit 400. This circuit monitors the voltage developed across the winding 3–4 and rectifies it with diode 421. This rectified voltage is averaged by the series integrating circuit comprising resistor 423 and the capacitor 422. The average DC voltage magnitude across capacitor 422 is representative of the output voltage of the converter and controls the conduction of transistor 402. If the voltage falls below a certain threshold due to a low output voltage, the normally conducting transistor 402 is biased nonconducting which in turn biases transistor 401 in its conducting state. The resulting current flow through the transistor 401 is utilized to activate a low voltage alarm device 413 to indicate a low voltage condition.

What is claimed is:

1. A converter circuit comprising a transformer including a primary winding, a secondary winding, and a regenerative feedback winding, means to accept a voltage source, switching means connected to couple said means to accept to said primary winding, drive means to initiate conduction in said switching means, output means coupled to said secondary winding, means to monitor an output signal at said output means, means to generate an error signal responsive to the deviation of the output signal from a desired magnitude, capacitive energy storage means responsive to said regenerative feedback winding and charging in response to conduction of said switching device, bias means responsive to the charge on said capacitive energy storage means to terminate conduction in said switching means at a particular final charge threshold level, and means responsive to said means to generate an error signal to establish an initial charging threshold level at which said capacitive energy storage means begins charging toward said particular threshold by controlling the voltage across said regenerative winding to be a function of said error signal during nonconduction of said switching device whereby the charging interval of said capacitive energy storage means is proportional to the error signal.

2. A converter circuit as defined in claim 1 wherein said means to establish an initial charging threshold comprises, a variable impedance circuit connected to limit voltage across said regenerative feedback winding, including a diode and a transistor connected in series, a control electrode of said transistor energized by said error signal, said diode being poled to block conduction through said transistor during conduction in said switching means.

3. A converter circuit as defined in claim 2 wherein, said bias means includes a second transistor responsive to said capacitive energy storage means, said second transistor coupled to disable said switching means in response to the attainment of said particular final charge threshold level on said capacitive energy storage means.

4. A converter circuit as defined in claim 3 wherein said drive means includes an impedance coupling said means to accept to a control electrode of said switching means, the second transistor having a base-emitter junction connected in parallel with said capacitive energy storage means.

5. In a self-oscillating regulated converter having input means to accept a source of voltage, output means to accept a load to be energized, and switching means intermediate to said input means and said output means, first regenerative feedback means to sustain periodic switching of said switching means, second regulation feedback means to control the duty cycle of said switching means, and frequency stabilization means to stabilize a frequency of periodic switching of said switching means including a charging network having a charge storage capacitor regeneratively charged by said first feedback means during conduction through said switching means and biasing said switching means into nonconduction upon attainment of a first magnitude, and means to establish a variable magnitude initial charge threshold on said charge storage capacitor whose magnitude is responsive to said second feedback means, and means to control conducting and nonconducting intervals of said switching device in an inverse proportional relationship to each other by equalizing the voltage-time product of said conducting and nonconducting intervals whereby the switching frequency of said switching means is stabilized.

6. A self-oscillating regulated converter as defined in claim 5 wherein, said means to establish a variable magnitude initial charge on said charge storage capacitor comprises, means to monitor a voltage at said output means, comparator means to generate an error signal responsive to the voltage at said output means, variable voltage clamping means to limit a charge voltage applied to said charge storage capacitor, said variable clamping means including a controlled impedance responsive to the error signal, and said means to control conducting and nonconducting intervals comprises a transformer intermediate to said switching means and said output means.

7. A converter circuit comprising a transformer including, a primary winding, a secondary winding, and a regenerative feedback winding, terminal means to accept a voltage source, a switching transistor connected to couple said terminal means to said primary winding and having a control electrode coupled to said regenerative feedback winding, wherein the improvement comprises, a signal regulator control winding magnetically coupled to said regenerative feedback winding, a charge storage capacitor connected to be charged to a voltage of a first polarity at a substantially fixed rate during conduction of said switching transistor by said regenerative feedback winding and coupled to a control electrode of said switching transistor, signal sensing means to monitor an output voltage generated by said secondary winding including means to generate an error voltage responsive to the deviation of the regulated voltage from a desired value, and voltage magnitude control means responsive to said error voltage and connected in shunt with said signal regulation control winding and operative to control the initial charge stored on said storage capacitor by controlling the magnitude of a charging voltage of a polarity opposite said first polarity whereby the charging interval of said storage capacitor is proportional to the error voltage.

8. A converter circuit as defined in claim 7 wherein said voltage magnitude control means comprises, a diode and a transistor impedance connected in series and a control electrode of said transistor impedance being coupled to receive said error voltage, said diode poled to conduct during nonconductive intervals of said switching transistor.

9. A converter circuit as defined in claim 8, further including means responsive to the voltage source to initiate conduction in said switching transistor including an impedance interconnecting said terminal means to a control electrode of said switching transistor.

10. A converter as defined in claim 8 wherein, a bias control transistor is coupled to a control electrode of said switching transistor, a control electrode of said bias control transistor is coupled to said charge storage capacitor whereby the bias control transistor is biased conducting in response to said charge storage capacitor to divert bias current from said switching transistor and bias it nonconducting.

* * * * *